United States Patent [19]

Peters

[11] 4,347,867
[45] Sep. 7, 1982

[54] SAFETY VALVE

[75] Inventor: Clifford M. Peters, Longview, Tex.

[73] Assignee: W-K-M Wellhead Systems, Inc., Shreveport, La.

[21] Appl. No.: 221,129

[22] Filed: Dec. 29, 1980

[51] Int. Cl.$^3$ .............................................. F16K 17/00
[52] U.S. Cl. .................................... 137/460; 137/462; 137/498
[58] Field of Search .................... 137/460, 462, 498

[56] References Cited

U.S. PATENT DOCUMENTS 2,668,555  2/1954  Bartolat ............................ 137/498
3,377,109  4/1968  Scott ............................. 137/498 X Primary Examiner—Harold W. Weakley
Attorney, Agent, or Firm—Eugene N. Riddle; Marvin J. Marnock

[57] ABSTRACT

A safety valve (14) adapted to be inserted within a flowline (10) comprises an elongate valve body (16) having central bore (24) with a fluid inlet (40) and a fluid outlet (42) in fluid communication with the bore (24). A slidable valve element (50) having a fluid passage (62) therein is mounted within the bore (24) and is slidable between the seated and unseated positions. A stop member (108) is mounted on the valve body (16) for relative movement between extended and retracted positions and has a stem which extends within the bore (24) along the longitudinal axis of the valve body (16). During normal operation valve element (50) is in a seated position and stop member (108) is in a retracted position, and thus, fluid flows from the fluid inlet (40) to the fluid outlet (42). However, in the event fluid pressure at the fluid outlet (42) decreases, the pressure at the fluid inlet (40) moves the valve element (50) into its unseated position wherein the stem abuts the valve element (50) and blocks fluid flow through the valve element (50) to the fluid outlet (42). A sealing ring (70) carried by valve element (50) adjacent the inlet port (66) provides a fluid-tight seal between the inlet port (66) and fluid inlet (40) only in the unseated position of the valve element (50).

9 Claims, 4 Drawing Figures

SAFETY VALVE

BACKGROUND OF THE INVENTION

The invention relates generally to safety valves, and in particular, to a safety valve that is automatically closable upon an inadvertent drop of pressure in a fluid downstream from the safety valve.

Flowlines utilized by the oil and gas industry have many devices such as gauges associated therewith. These devices are relatively fragile so that on occasion they are broken during the normal operation of the flowline. This, of course, results in a fluid product being exposed to the atmosphere which can in many instances be highly undesirable inasmuch as many flowlines carry products which are harmful to the environment as well as to the health of persons coming in contact therewith.

Heretofore, valves which are automatically closable upon an inadvertent drop in pressure in a fluid flowline have generally been of a somewhat complicated structure utilizing springs, pressure operated diaphragms and the like, and are exemplified by U.S. Pat. No. 3,618,689 issued to German, U.S. Pat. No. 3,628,562 issued to Bruins, and U.S. Pat. No. 3,661,173 issued to Bauer. U.S. Pat. No. 3,949,786 issued to Houston shows a safety valve which utilizes a ball contained loosely within a chamber and arranged so as to engage a valve seat when there is a sudden pressure drop in the flowline thus preventing flow. While these patents show devices which appear to be closable upon a drop in flowline pressure, some of them show a relatively complicated structure and all of them appear to create fluid-tight seals at only one location.

In the light of the serious consequences which could result if such a safety valve malfunctioned at its sole sealing location, it would be highly desirable to provide a safety valve that creates fluid-tight seals at a plurality of locations.

Oftentimes a gauge or the like that receives pressure from the safety valve needs to be changed or repairs made to so that pressure to the gauge must be shut off when desired. Thus, it would be highly desirable to provide a safety valve that can be selectively shut off.

SUMMARY OF THE INVENTION

Thus, it is an object of the invention to provide a safety valve which is automatically closable upon an inadvertent drop in flowline pressure and creates fluid-tight seals at a plurality of locations when moved to the closed position.

It is also an object of the invention to provide a safety valve that is automatically closable upon an inadvertent drop in flowline pressure and can be selectively moved from an open to a closed position.

The invention is a safety needle valve adapted to be inserted in a fluid flowline comprising a valve body which has a longitudinal bore and which has spaced fluid inlet and outlet ports in fluid communication with the longitudinal bore. An adjustable stop member is connected to the valve body for predetermined movement relative to the valve body, and has a stem which extends into the longitudinal bore so as to provide an abutment within the bore. A movable valve element is positioned within the bore between the fluid inlet and outlet for movement in response to a decrease in fluid pressure at the fluid outlet from a seated position, in which the valve element is spaced axially inward of the stop member so that fluid is allowed to flow from the fluid inlet to the fluid outlet, to an unseated position, in which the valve element abuts against the stop member thereby preventing fluid flow from the fluid inlet to the fluid outlet.

DETAILED DESCRIPTION OF A SPECIFIC EMBODIMENT

Figure 1:
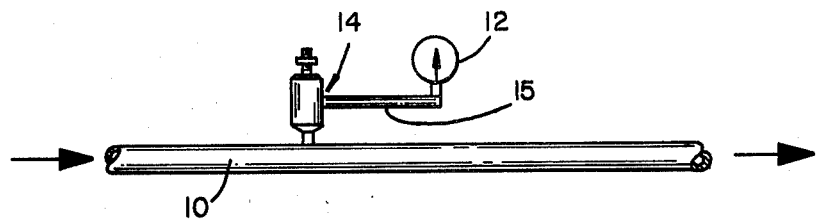
FIG. 1 is a diagrammatic view of a fluid flowline in which the safety valve of the invention is inserted and a gauge is connected to the fluid outlet of the safety valve.

Referring to FIG. 1, there is illustrated the general arrangement of a fluid flowline 10 which has a safety needle valve 14 connected thereto. A gauge 12 is connected by line 15 to safety needle valve 14. Although the gauge 12 is shown as connected by line 15 to the safety needle valve, the gauge could also be directly connected to the fluid outlet of the safety needle valve if desired.

Figure 2:
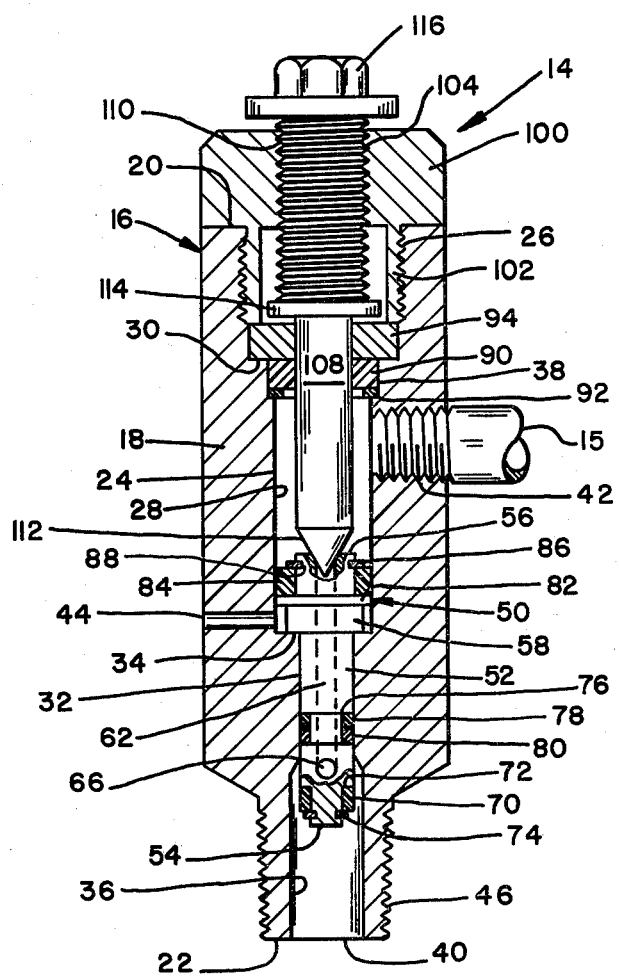
FIG. 2 is a sectional view of the safety valve of FIG. 1 with certain parts shown in elevation wherein the needle stem is fully extended into the longitudinal bore for positively holding the valve element in its seated position and blocking fluid flow through the valve.
Figure 3:
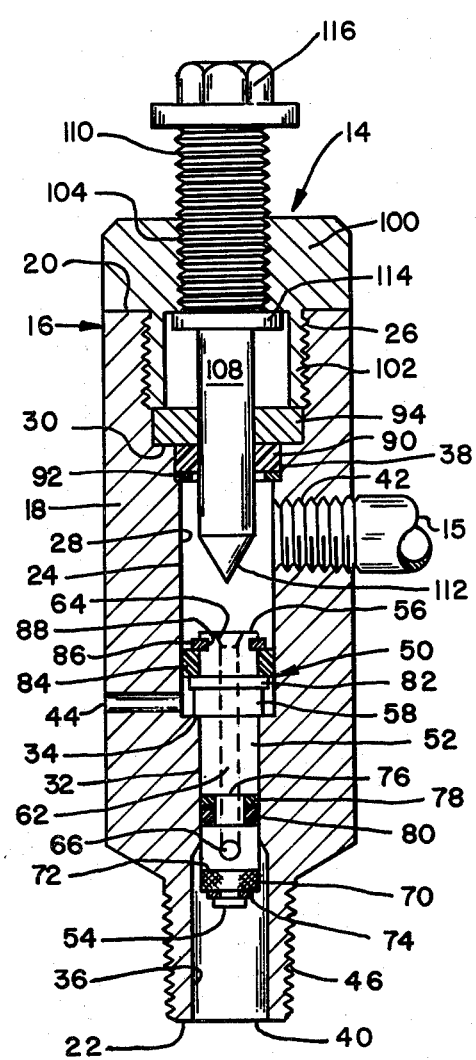
FIG. 3 is a sectional view of the safety valve of FIG. 1 with certain parts shown in elevation wherein the needle stem is retracted and the valve element is in its operable seated position with fluid flow permitted through the valve.
Figure 4:
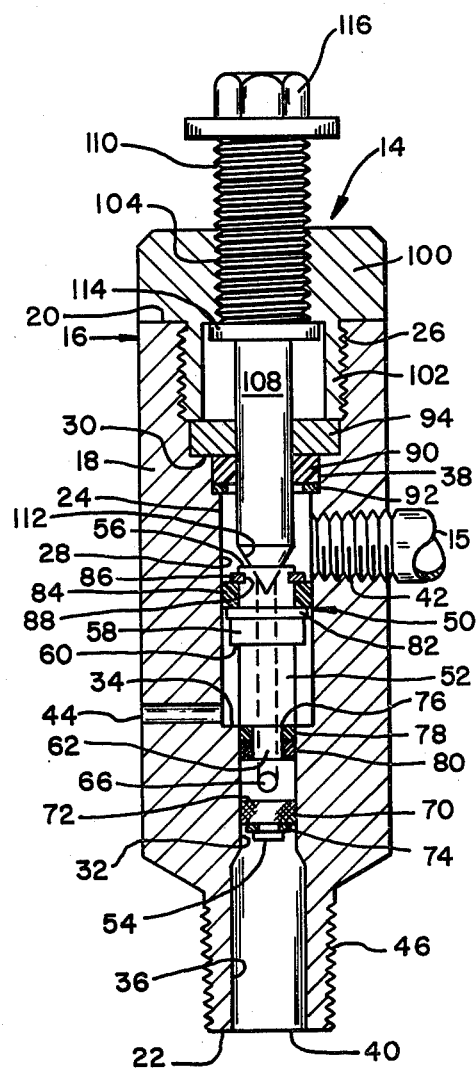
FIG. 4 is a sectional view of the safety valve of FIG. 1 with certain parts shown in elevation wherein the movable valve element is in its unseated or closed position and fluid flow through the valve is blocked.

Referring specifically to FIGS. 2–4, safety needle valve 14 has a valve body 16 which includes an elongate body member 18 having opposite outer and inner ends 20 and 22, respectively, and a longitudinal bore 24 therethrough. Longitudinal bore 24 has an inner enlarged diameter bore portion 36 adjacent the inner end of the valve body. A reduced diameter bore portion 32 is spaced axially outward of inner enlarged diameter bore portion 36. An outer enlarged diameter bore portion 28 is positioned axially outward of reduced diameter bore portion 32 and is joined therewith by an inner annular seat 34. An internally threaded portion 26 of longitudinal bore 24 is located axially outward of outer enlarged diameter bore portion 28 and is joined therewith by an outer annular seat 30. An end cap 100 having a centrally threaded aperture 104 and a reduced diameter threaded portion 102 is threadedly attached to elongate body member 18 at threaded portion 26 thereof. End cap 100 and elongate body member 18 together comprise valve body 16.

Elongate body member 18 further includes a fluid inlet port 40 at the inner end thereof which communicates directly with inner enlarged diameter bore portion 36, a fluid outlet port 42 which communicates directly with outer enlarged diameter bore portion 28, and a vent port 44 which is positioned adjacent inner annular seat 34 and communicates directly with outer enlarged diameter bore portion 28. Fluid outlet port 42 is directly connected to gauge 12 by line 15. A set of external threads 46 is cut into the exterior surface of elongate body member 18 adjacent inner end 22 thereof so as to facilitate the connection of the safety needle valve to the fluid flowline.

Movable valve element 50 comprises an elongate body 52 having opposite inner and outer ends 54 and 56, respectively, and an enlarged diameter portion 58 positioned axially inward of outer end 56 and which forms a shoulder 60. Valve element 50 has a central axial bore or passageway 62 therethrough which has a conically-shaped seat 64 at the outer end thereof and a cross port or inlet port 66 at the inner end thereof. Cross port 66 passes transversely through valve element 50 and is spaced axially outward of inner end 54.

Valve element 50 has a first annular groove 72 therein positioned between cross port 66 and inner end 54. Annular groove 72 carries a first annular sealing ring 70 for selectively sealing between valve element 50 and reduced diameter bore portion 32 thereby selectively fluidly isolating cross port 66 from fluid inlet port 40. First annular sealing ring 70 is retained in annular groove 72 by a split ring 74. Valve element 50 has a second annular groove 76 therein positioned axially outward of cross port 66. Annular groove 76 carries a sealing assembly comprised of a second annular sealing ring 78 and an O-ring 80 for continuously sealing between valve element 50 and reduced diameter bore portion 32. A washer 82 rests on top of enlarged diameter portion 58 of valve element 50. A third annular sealing ring 84 for continuously sealing between valve element 50 and outer enlarged diameter bore portion 28 is sandwiched between washer 82 and a split ring 86 contained within an annular groove 88 adjacent the outer end of valve element 50.

Outer enlarged diameter bore portion 28 has an annular groove 38 contained therein adjacent outer annular seat 30. An annular sealing ring 90 is maintained in annular groove 38 by being sandwiched between a thin washer 92 retained within annular groove 38 and a thick washer 94 which rests upon outer annular seat 30.

A needle stem member 108 has a threaded portion 110 adjacent the outer end thereof, and a conical shoulder 112 at the inner end thereof. A collar 114 is positioned on needle stem member 108 mediate of the inner and outer ends thereof, and a hex nut 116 is located at the outer end thereof. Needle stem member 108 is threadedly connected to end cap 100 at central threaded aperture 104 thereof. Needle stem member 108 extends into longitudinal bore 24 so as to provide a selectively positionable stationary abutment against which valve element 50 can abut. Annular sealing ring 90 continuously provides a fluid-tight seal between needle stem member 108 and the longitudinal bore.

In operation, and referring specifically to FIG. 2, needle stem member 108 is illustrated in its inward position seated against valve element 50 when valve element 50 is seated on inner annular seat 34. There exists a space between collar 114 and thick washer 94 of sufficient dimension for longitudinal travel of the needle stem so that the needle stem can maintain an effective metal-to-metal seal with valve element 50 when in the position illustrated by FIG. 2 despite variations between the components of the valve. When in the position illustrated by FIG. 2, safety needle valve 14 prevents the flow of fluid therethrough due to the metal-to-metal seal between conical shoulder 112 and conical seat 64 which effectively blocks the flow of fluid through central axial bore 62, and the soft fluid-tight seals created by the annular sealing rings 78 - O-ring 80 assembly and annular sealing ring 84 which effectively prevents fluid from passing between valve element 50 and longitudinal bore 24.

From the position illustrated in FIG. 2, the safety needle valve may be placed in its operable position by gradually moving needle stem member 108 axially outward of valve element 50. Once the metal-to-metal seal between valve element 50 and needle stem member 108 is broken, fluid enters into outer enlarged diameter bore portion 28 and eventually equalizes fluid pressure at both ends of movable valve element 50 so that valve element 50 is maintained in its seated or open position as illustrated in FIG. 3. Needle stem member 108 is continually moved axially outward until it reaches a preselected position. In FIGS. 3 and 4 needle stem member 108 is illustrated in its outermost position in which collar 114 abuts end cap 100.

Referring specifically to FIG. 3, the safety needle valve is illustrated in an operable position in which valve element 50 is unseated so as to be spaced axially inward of needle stem member 108 and fluid flows into fluid inlet port 40, through cross port 66 and into central axial bore 62, into outer enlarged diameter bore portion 28 and out through fluid outlet port 42. The soft fluid-tight seals created by annular sealing ring 78 - O-ring 80 assembly and annular sealing ring 84 still effectively prevent fluid from passing between valve element 50 and longitudinal bore 24. As long as the fluid pressure at both ends of valve element 50 remains equal, valve element 50 will remain in a seated position and fluid will flow through the safety needle valve as illustrated in FIG. 3.

In the event a device such as gauge 12, which is connected to the flowline through safety needle valve 14, is broken, the fluid product in the gauge or the conduit connecting the gauge to the safety valve will be vented to atmosphere. A sudden decrease in pressure at both the fluid outlet port 42 and outer enlarged diameter bore portion 28 will then occur in comparison to no sudden decrease in fluid pressure at fluid inlet port 40. This pressure differential will allow the greater fluid pressure at fluid inlet port 40 to act upon valve element 50 so as to move valve element 50 into its unseated or closed position as illustrated in FIG. 4. When valve element 50 is in the closed position, a metal-to-metal seal is created between the conical shoulder of needle stem 108 and the conical seat of valve element 50 so as to effectively block the flow of fluid through central axial bore 62. A fluid-tight soft seal between valve element 50 and reduced diameter bore portion 32 is created by the annular sealing rings 78 - O-ring 80 assembly. Another fluid-tight soft seal between valve element 50 and reduced diameter bore portion 32 is created by annular sealing ring 70 so as to isolate cross port 66, and hence central axial bore 62, from fluid inlet port 40. Finally, a fluid-tight seal between valve element 50 and outer enlarged diameter bore portion 28 is created by annular sealing ring 84. Vent port 44 also communicates with the portion of outer enlarged diameter bore portion 28 located axially inward of washer 82 so as to vent any fluid which might leak past the second or third annular sealing rings. Once valve element 50 moves into its seated position, fluid product from the flowline will be blocked from flowing to atmosphere through the broken gauge. Once the broken gauge is fixed, the safety needle valve can be moved from its closed to its open position as described above.

In the event the gauge needs to be repaired or replaced and such activities require that pressure to the gauge be shut off, the safety needle valve may be moved from the operable position as illustrated by FIG. 3 to the closed position as illustrated by FIG. 2. This movement is done by rotating the needle stem member so that it moves inwardly until it is seated in the valve element 50. Flow to the gauge is now stopped, and the gauge can be removed without leakage of the fluid product to the atmosphere. Once the repair or replacement has been completed, the safety needle valve can be moved from its closed to its open position as described above.

What is claimed is:

1. A safety valve adapted to be inserted within a flowline comprising:

an elongate valve body having a longitudinally extending central bore, said valve body having a fluid inlet in fluid communication with said bore, a fluid outlet in fluid communication with said bore and spaced longitudinally from said fluid inlet;

a slidable valve element mounted within said bore between said fluid inlet and said fluid outlet and slidable between seated and unseated positions relative to said valve body, said valve element having a fluid passage within an inlet port thereof in fluid communication with said fluid inlet in the seated position and an outlet port thereof normally in fluid communication with said fluid outlet in the seated position, said outlet port being positioned at an outer end of said valve element along its longitudinal axis and having a seat thereabout;

a stop member mounted on said valve body for relative movement between extended and retracted positions and having a stem extended within said bore along the longitudinal axis of said valve body, said stop member when in a retracted position permitting movement of said valve element to the unseated position and when in a fully extended inward position engaging said valve element and holding said valve element in the seated position on said valve body, said stem being seated on said seat about said outlet port in said fully extended position and blocking fluid flow through said valve element to said fluid outlet; and sealing means, positioned between said fluid inlet and said inlet port, for providing a fluid-tight seal between said inlet port and said fluid inlet in the unseated position, said sealing means in the seated position permitting fluid flow between said fluid inlet and said inlet port.

2. The safety valve as set forth in claim 1 wherein said sealing means includes an elastomeric ring carried by said valve element adjacent said inlet port, said bore having a reduced diameter bore portion and an inner enlarged diameter bore portion axially inward of said reduced diameter bore portion and being adjacent said elastomeric ring, said elastomeric ring being positioned within said enlarged diameter bore portion in the seated position out of sealing engagement with said valve body, and said elastomeric ring being positioned within the reduced diameter bore portion in the unseated position of said valve element being in sealing engagement with said bore so as to block fluid communication between said inlet port and said fluid inlet.

3. The safety valve as set forth in claim 1 further comprising:

a first elastomeric ring carried by said valve element adjacent said outlet port so as to continuously seal between said valve element and said bore.

4. The safety valve as set forth in claim 3 further comprising:

a second elastomeric ring carried by said valve element axially inward of said first elastomeric ring so as to continuously seal between said valve element and said bore.

5. The safety valve as set forth in claim 4 further including:

an outer enlarged diameter bore portion axially outward of said reduced diameter bore portion, said valve body having a vent port therein providing continuous communication between atmosphere and the portion of said bore contained between said first and second elastomeric rings.

6. A safety valve adapted to be inserted within a flowline comprising:

a generally elongate valve body having a longitudinally extending central bore, said valve body having adjacent one end thereof a fluid inlet in fluid communication with said bore and a fluid outlet adjacent the other end thereof in fluid communication with said bore and spaced longitudinally from said fluid inlet;

a slidable elongate valve element mounted within said bore between said fluid inlet and said fluid outlet and slidable between seated and unseated positions, said valve element having a fluid passage with an inlet port thereof in fluid communication with said fluid inlet in the seated position and an outlet port thereof normally in fluid communication with said fluid outlet in the seated position, said outlet port having a tapered seat and being positioned generally at an outer end of said valve element along the longitudinal axis thereof; and an adjustable needle valve mounted on said valve body and having a stem extending within said bore along the longitudinal axis of said valve body, said stem having a tapered inner end for fitting within said outlet port on said tapered seat in the unseated position to stop movement of said valve element and to block fluid flow from said outlet port, said elongate valve element moving to the unseated position against said stem in response to a decrease in fluid pressure at said fluid outlet.

7. A safety valve as set forth in claim 6 wherein said tapered inner end of said stem is conically shaped and when seated on said tapered seat about said outlet port provides a tight metal-to-metal seal for blocking fluid flow from said outlet port; and said needle valve being externally threaded and said valve body having an externally threaded opening receiving said needle valve, the rotation of said needle valve in one direction moving said stem towards said elongate valve element at the fully extended position of said stem so as to hold said valve element in a seated position on said valve body with said stem seated on said outlet port thereby to block fluid flow from said outlet port when the valve element is in the seated position.

8. The safety valve set forth in claim 7 wherein the rotation of said needle valve in the other direction when said valve element is in the fully extended position moves the stem away from said valve element so that fluid flows from said outlet port and equalizes fluid pressure at said fluid inlet and said fluid outlet and said valve element remains in the seated position so that said stem may be moved to a fully retracted position.

9. A safety valve adapted to be inserted within a flowline comprising:
- a generally elongate valve body having a longitudinally extending central bore, said valve body having adjacent one end thereof a fluid inlet in fluid communication with said bore and a fluid outlet adjacent the other end thereof in fluid communication with said bore and spaced longitudinally from said fluid inlet;
- a slidable elongate valve element mounted within said bore between said fluid inlet and said fluid outlet and slidable between seated and unseated positions, said valve element having a fluid passage with an inlet port thereof in fluid communication with said fluid inlet in the seated position and an outlet port thereof normally in fluid communication with said fluid outlet in the seated position;
- valve seat means in the form of an annular surface at the outer end of said valve element along the longitudinal axis thereof, and in surrounding relation to said outlet port;
- an adjustable stop member mounted on said valve body for relative movement between extended and retracted positions and having a stem extending within said bore along the longitudinal axis of said valve body, said stem having an inner end adapted to engage said valve seat means, said stop member when in its extended position engaging said valve element and holding said valve element in its seated position on said valve body with said stem seated on said valve seat means and blocking fluid flow through said valve element to said fluid outlet, said stop member when in its retracted position permitting movement of said valve element to the unseated position, said elongate valve element moving to the unseated position against said stem in response to a decrease in fluid pressure at said fluid outlet.

* * * * *